Patented Oct. 16, 1951

2,571,114

UNITED STATES PATENT OFFICE 2,571,114

DI(TERT-ALKYL)MERCAPTALS

Willie W. Crouch, Bartlesville, Okla., assignor to Phillips Petroleum Company, a corporation of Delaware No Drawing. Original application December 26, 1944, Serial No. 569,901. Divided and this application September 27, 1946, Serial No. 699,633

4 Claims. (Cl. 260—609)

The present invention relates to novel sulfur compounds. More particularly the invention relates to compounds of the mercaptal type represented by the formula $RCH(SR')_2$ where R represents either hydrogen or alkyl radical and R' represents a tertiary alkyl radical. In a specific aspect the present invention relates to such sulfur compounds and their use as a solvent in the separation of saturated and unsaturated hydrocarbons. This is a division of my copending application, Serial No. 569,901, filed December 26, 1944, now United States Patent 2,422,341, issued June 17, 1947.

Modern developments in the production of high-octane gasoline and synthetic rubber have imposed problems of hydrocarbon segregation which are not readily solved by conventional means such as fractional distillation. Thus in the manufacture of butadiene from n-butane, the separation of low boiling butene-2 (B. P. 33.8° F.) from n-butane (B. P. 30.9° F.) is virtually impossible even in the most efficient distillation columns. Similarly, the separation of butadiene from admixed olefins such as butene-1 with a boiling point differential of only 2.5° F. requires treatment other than fractional distillation. Similar separation problems are also encountered in the preparation of normally gaseous feed stocks for use in alkylation and codimer plants. Present practice in making such difficult separations involves the use of extractive distillation wherein a relatively nonvolatile solvent is employed in the manner of, but in addition to, normal reflux. The solvent by virtue of its selective absorption action favorably affects the relative volatilities of the hydrocarbons in question to such an extent that an efficient fractionating tower can effect the desired separation. Among the solvents which have found commercial acceptance for extractive distillation in the butadiene field are furfural, B,B'-dichloroethyl ether (chlorex) and acetone. However, there are certain inherent disadvantages connected with the prolonged use of these solvents at distillation temperatures among which may be mentioned polymerization and tar formation in the case of furfural, hydrolysis with resultant corrosion in the case of the dichloroethyl ether, and solvent loss coupled with inefficient extraction in the case of acetone. Thus, it is obvious that solvents of comparable selectivity, but with superior stability would represent an advance in the art.

It is, therefore, an object of this invention to provide for the separation of hydrocarbon compounds of different chemical constitution by means of selective solvents comprising di(tert-alkyl) mercaptals.

Another object of the present invention is to provide a new and improved class of solvents for use in the extractive distillation of mixtures of normally gaseous saturated and unsaturated hydrocarbons which comprises selected aliphatic mercaptals.

A further object of this invention is to provide tertiary aliphatic mercaptals as selective solvents in the separation of saturated and unsaturated normally gaseous hydrocarbons.

Another object is to provide the mercaptals of tertiary aliphatic mercaptans as selective solvents in the separation of diolefins from monoolefins.

A still further object of this invention is to provide new and useful chemical compositions comprising the mercaptals of tertiary mercaptans.

Other objects and advantages of the present invention will become apparent from the subsequent disclosure and appended claims.

I have discovered that the mercaptals of the lower aliphatic aldehydes show a preferential solvent activity toward the various types of hydrocarbons. The mercaptals formed from the lower aliphatic aldehydes and tertiary alkyl mercaptans constitute a class of compounds particularly desirable as selective solvents for unsaturated types of hydrocarbons. In general, the unsaturated types are absorbed to a greater extent than the corresponding saturated compounds and, among the unsaturates, the more unsaturated compounds are dissolved to a greater extent than the more saturated compounds.

While the preparation of mercaptals from a condensation of aldehydes with mercaptans has been described, in general, the mercaptals of this invention, namely, those from the tert-alkyl mercaptans, have not, to my knowledge, been prepared or described in published literature.

Since the present mercaptal solvents, whose preparation is described hereinafter, are miscible with hydrocarbons, vapor-liquid extraction is preferred. A convenient method for such extraction is a system of extractive distillation in which hydrocarbon vapors are contacted countercurrently with the liquid solvent in a fractionating tower or distillation column. Ordinarily the mixture of hydrocarbons being separated is vaporized and introduced into a lower section of the tower where the vapors pass countercurrently to the liquid solvent and/or reflux which is introduced at a point higher in the tower. The more unsaturated compounds are selectively absorbed and concentrated in the liquid body of solvent collecting in the bottom of the tower and the remainder of the vapors pass overhead in the effluent wherein the more saturated compounds are concentrated. The absorbed compounds are subsequently recovered from the solvent in a separate operation. The temperature for the absorption operation is above the bubble temperature of the hydrocarbon mixture and below the boiling temperature of the solvent. If a normally gaseous mixture is being separated by extractive distillation, a relatively low temperature may be employed, while if a normally liquid mixture is separated by the same process a higher temperature is usually required. Subatmospheric pressures may be employed in order to reduce the temperature if the hydrocarbon mixture is thermally unstable at higher temperatures. Suitable temperatures may range from about the bubble temperature of the mixture or melting point of the solvent compound (whichever is lower) to about 250–300° F. or below the boiling temperature of the solvent at pressures from about 0.1 pound per square inch absolute up to about 200–300 pounds per square inch or higher.

Mercaptals useful in the practice of this invention may be formed by the condensation of suitable aldehydes with selected mercaptans in the presence of hydrochloric acid according to the reaction,

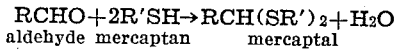
$$RCHO + 2R'SH \rightarrow RCH(SR')_2 + H_2O$$
aldehyde  mercaptan  mercaptal where R is either hydrogen or an alkyl group, and R' is an alkyl group, preferably of tertiary configuration.

Where R is hydrogen and R' is a tertiary butyl radical the product is formaldehyde di(tert-butyl) mercaptal; if R is a methyl group and R' a tertiary dodecyl radical the compound is acetaldehyde di(tert-dodecyl) mercaptal, etc.

Mercaptans containing a tertiary alkyl group are preferred, in the preparation of the mercaptals of this invention because of their availability and the stability of the mercaptal compound formed therefrom. Processes suitable for preparing this type of mercaptan from olefins and hydrogen sulfide are the subject of several copending applications of which I am a coinventor and one copending application, Serial No. 493,466, filed July 3, 1943, now Patent Number 2,392,555 issued January 8, 1946 to Walter A. Schulze, in particular, is concerned with a two-stage process involving the isomerization of an olefinic feed stock and reaction of the isomerized feed with hydrogen sulfide to form tertiary mercaptans. Mercaptals formed from tertiary mercaptans are found to be exceptionally stable to heat and hydrolytic cleavage and are somewhat analogous to other tertiary carbon compounds in their stability over compounds of primary and secondary configuration.

The tertiary alkyl derivatives of aliphatic aldehydes which are the preferred solvents of this invention include those mercaptals having sulfide radicals containing tertiary alkyl substituents ranging from butyl to cetyl or higher. For the aldehyde of the reaction, readily available compounds such as formaldehyde and acetaldehyde are ordinarily used in the preparation of the preferred mercaptals but the higher aliphatic homologs, such as propionaldehyde, butyraldehyde and others, may be used. Aromatic and/or cyclic aldehydes are not excluded but tend to form heavy viscous liquids or solids, upon reaction with the mercaptans and so are not as desirable as the lighter compounds in the preparation of the selective solvents. However, the mercaptals may be used in admixture with diluents or auxiliary solvents provided the mercaptal and/or mixture of mercaptal and auxiliary solvent or diluent are unreactive with the hydrocarbon mixture being separated. Similarly, the mercaptal solvent of this invention may be a mixture of two or more of the tertiary aliphatic mercaptals which are the preferred solvents of this invention.

Description of the preparation of the novel solvents of this invention and of the effectiveness of the solvents in the separation of mixtures of hydrocarbons of varying degree of saturation is given in following examples which are presented for the purpose of illustration only and are not intended to limit the scope of the invention.

EXAMPLE I

Acetaldehyde is added to 2.2 mol equivalents of tertiary butyl mercaptan and a stream of dry hydrogen chloride introduced into the solution. The mixture is maintained at or near room temperature by cooling in a water bath. After two hours the reaction is complete. The product is obtained in essentially pure state by distillation at 60 mm. pressure. Analysis of a typical product revealed 31.20 weight per cent of sulfur as compared with 31.18 per cent calculated for acetaldehyde tertiary butyl mercaptal. The physical properties of the mercaptal are shown in the subjoined tabulation:

Boiling point, 60 mm _____°F__ 275–277
Density, g./ml. at 75° F_____ 0.910
Refractive index, 20° C_____ 1.4858

A sample of the mercaptal (acetaldehyde di-tert.-butyl mercaptal) is used as a selective solvent in the extractive separation of a hydrocarbon mixture of n-butane, butene-1 and butadiene. The evaluation was carried out as a one-plate or single stage extractive treatment wherein the hydrocarbon system of known composition is commingled with the mercaptal in such a manner as to provide gas-liquid equilibrium. The hydrocarbon composition in the dissolved and gaseous phases at 140° F. and 60 pounds per square inch absolute is given in the following Table I.

*Table I*

| | Blend | Gas Composition, in Mol Per Cent | |
| --- | --- | --- | --- |
| | | Dissolved Gas | Undissolved Gas |
| n-butane | 27 | 21.5 | 36.3 |
| Butene-1 | 47 | 50.3 | 43.0 |
| Butadiene | 26 | 28.2 | 20.7 |

EXAMPLE II

Another sample of the acetaldehyde di(tert-butyl) mercaptal of Example I is used in a single stage or one-plate extractive treatment in which the hydrocarbon blend of Example I is commingled with the mercaptal to provide gas-liquid equilibrium at 140° F. and 50 pounds per square inch absolute. The hydrocarbon composition in the dissolved and gaseous phases is given in the following Table II.

Table II

|  | Blend | Gas Composition, in Mol Per Cent | |
|---|---|---|---|
|  |  | Dissolved Gas | Undissolved Gas |
| n-butane | 27 | 20.5 | 40.0 |
| Butene-1 | 47 | 51.1 | 40.2 |
| Butadiene | 26 | 28.4 | 19.8 |

An examination of the data in the tables accompanying the preceding examples shows that the mercaptal is effectively selective for the unsaturated hydrocarbons. The concentration of the unsaturated compounds in the dissolved gas which is recovered was increased about 10 per cent, the increase in concentration of the more unsaturated hydrocarbon, butadiene, being the greater. The concentration of the unsaturated compound in the undissolved gas is consequently decreased from the concentration of the original blend. At the same time, the percentage of butane, or saturated hydrocarbons, has substantially increased in the undissolved gas.

For comparison, similar data are presented on extraction with furfural which has been used extensively in commercial extraction. The evaluation was conducted in apparatus similar to that used in the examples under the favorable conditions of temperature and pressure of 167° F. and 85 pounds p. s. i.

Table III

|  | Blend | Gas Composition in Mol Per Cent | |
|---|---|---|---|
|  |  | Dissolved Gas | Undissolved Gas |
| n-butane | 27 | 24.2 | 29.3 |
| Butene-1 | 47 | 48.3 | 49.6 |
| Butadiene | 26 | 27.5 | 21.1 |

The data in Table III show that furfural is selective in the extraction of unsaturated hydrocarbons since the concentrations of butene-1 and butadiene are increased in the dissolved portion of the gas and the concentration of the butane is decreased therein. However, it is further evident from the table that the selectivity of the mercaptal in separating the unsaturated from the saturated compounds as shown in Tables I and II is greater than that of furfural as indicated in Table III.

EXAMPLE III

Acetaldehyde di(tertiary dodecyl) mercaptal is prepared from acetaldehyde and a mixture of isomeric $C_{12}$ mercaptans of which about 99 per cent have the tertiary carbon configuration. Dry hydrogen chloride is passed into a stoichiometric mixture of reactants maintained at or near room temperature for a period of four hours. The final reaction mixture is dissolved in pentane, washed with water followed by sodium bicarbonate solution to remove hydrogen chloride. The solvent is then stripped from the product and a final steam distillation operation is employed to remove unreacted mercaptan. A typical synthesis resulted in a product having a sulfur content of 14.4 per cent with a refractive index, $n_D^{20}$ of 1.4928 and a density at 75° F. of 0.920.

The properties of acetaldehyde di(tert-dodecyl) mercaptal as a selective solvent for unsaturated compounds were closely analogous to acetaldehyde di(tert-butyl) mercaptal described in the previous examples.

The foregoing data indicate that the solvents of the present invention are highly suitable for the separation of paraffins, olefins and diolefins from each other. These solvents are also applicable to the separation of aromatic compounds from more saturated compounds, such as separation of benzene and toluene from naphtha fractions containing the same.

Various modifications and changes may be made without departing from the spirit of the invention which should be limited only by the scope of the following claims.

I claim:

1. As novel and useful chemical compounds, di(tert-alkyl) mercaptals wherein said alkyl group contains from 4 to 16 carbon atoms.

2. An organic sulfur compound comprising a di(tertiary alkyl) mercaptal prepared by the interaction of an aldehyde and alkyl mercaptan in which the alkyl group comprises at least 4 but not more than 16 carbon atoms in tertiary configuration.

3. As a novel composition of matter, acetaldehyde di(tert-butyl) mercaptal.

4. As a novel composition of matter, acetaldehyde di(tert-dodecyl) mercaptal.

WILLIE W. CROUCH.

REFERENCES CITED

The following references are of record in the file of this patent:

UNITED STATES PATENTS

| Number | Name | Date |
|---|---|---|
| 2,366,453 | Meadow | Jan. 2, 1945 |
| 2,369,612 | Schirm | Feb. 13, 1945 |
| 2,422,341 | Crouch | June 17, 1947 |

OTHER REFERENCES

Serial No. 205,989, Schirm, (A. P. C.), published April 20, 1943.

Chem. Abs., vol. 35:2855 (1941).